Dec. 17, 1935. J. I. HAASE 2,024,577
APPARATUS FOR SPLICING RUBBER ARTICLES
Filed March 26, 1931 2 Sheets-Sheet 1
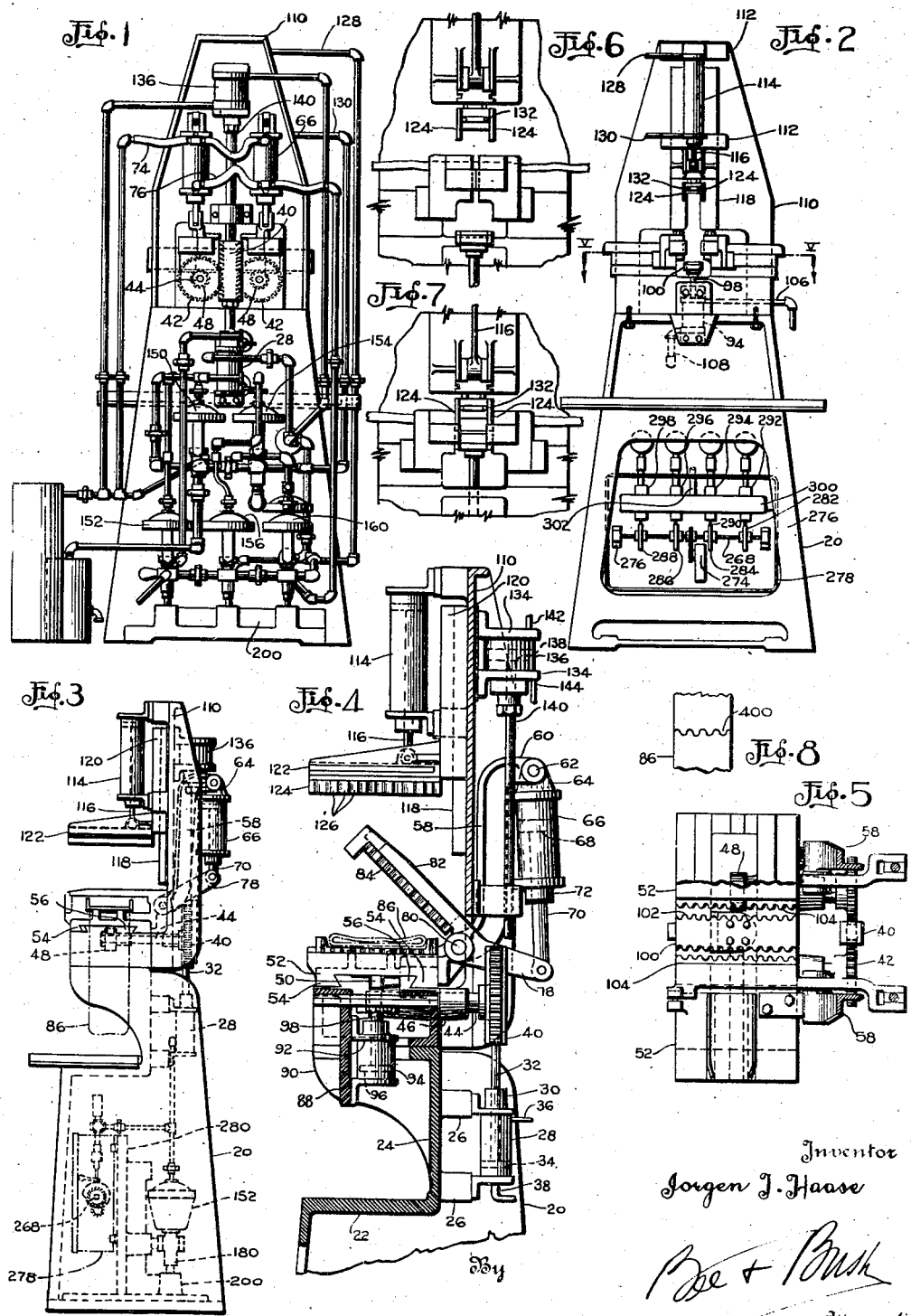
Inventor
Jorgen J. Haase
By Bee & Bush
Attorneys

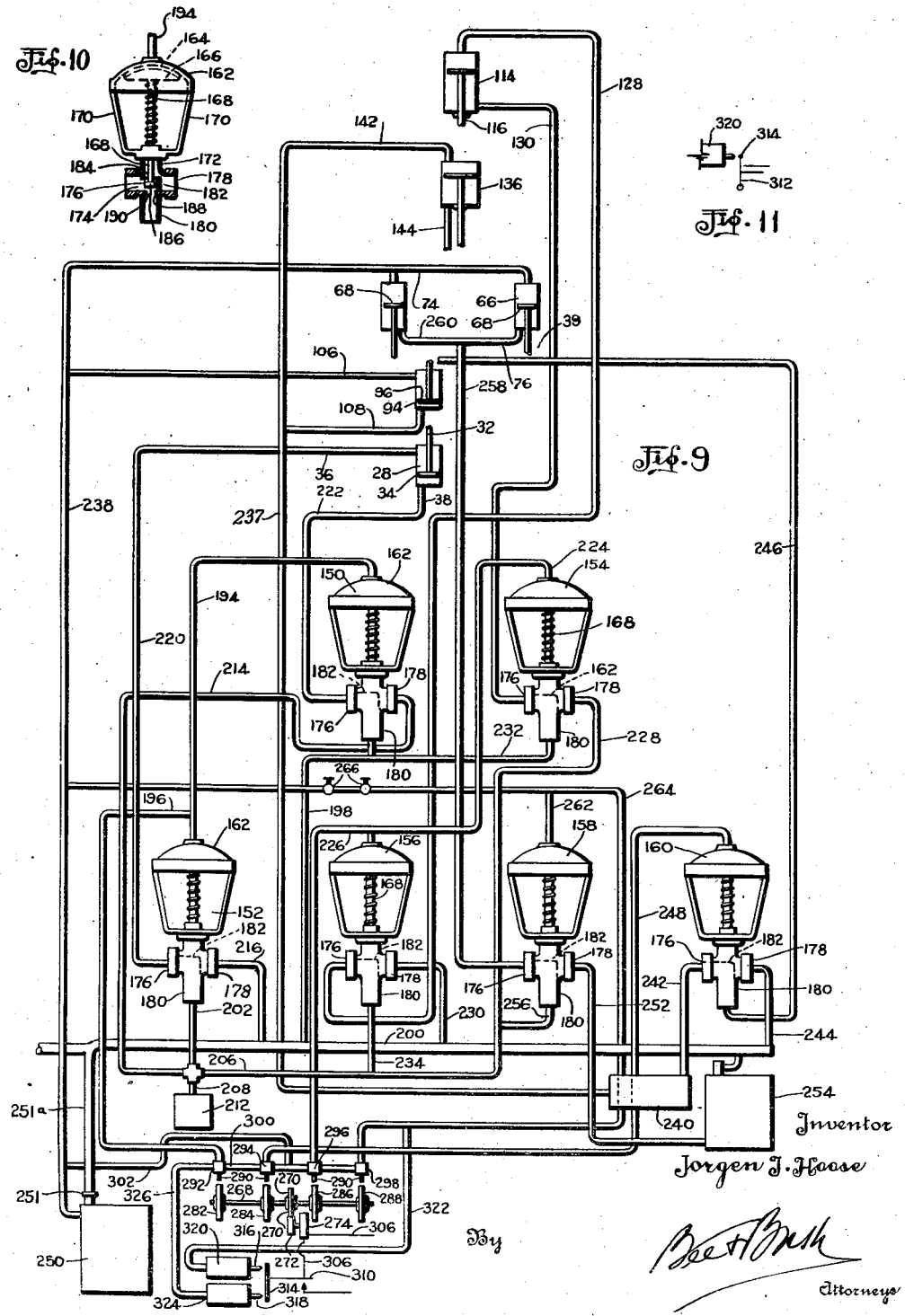

Patented Dec. 17, 1935

2,024,577

UNITED STATES PATENT OFFICE 2,024,577

APPARATUS FOR SPLICING RUBBER ARTICLES

Jorgen I. Haase, Akron, Ohio, assignor to Wingfoot Corporation, Wilmington, Del., a corporation of Delaware Application March 26, 1931, Serial No. 525,416

37 Claims. (Cl. 154—9)

This invention relates to a method of and apparatus for splicing two portions of rubber, and it has particular relation to a method of and apparatus for splicing the ends of elongated rubber articles to form endless bands or tubes. Examples of such articles are the hollow rubber tubes of the type employed for retaining air within pneumatic tires and the strips of rubber used to form tire treads.

One object of the invention is to provide a method of and apparatus for splicing contiguous ends or portions of rubber in which the portions to be joined together are moved together in abutting relation and are held in that position for a sufficient length of time to insure adhesion.

Another object of the invention is to provide a method of splicing ends of rubber bodies in which the use of cement is obviated.

Another object is to splice the ends of rubber articles, such as inner tubes, while the ends are held in a flattened condition.

Another object of the invention is to provide an apparatus, the use of which results in a reduction in the time and labor required to splice portions of rubber.

Heretofore, in the manufacture of such rubber articles as pneumatic tubes employed as air containers within pneumatic tires, it has been customary to form a cylindrical tube of unvulcanized rubber compound. According to one method of treating these tubes, the ends thereof were skived to a feather edge, after which the skived portions were buffed and coated with a rubber cement and then brought into overlapping relation to form a joint. The tubes were then placed in individual hollow molds and inflated with a suitable fluid and cured as endless rings. This method was termed the "full mold" method.

A second method comprised placing the green or unvulcanized tubes upon mandrels and then subjecting a plurality of tubes simultaneously to vulcanization in a pot type heater or vulcanizing chamber. After the cure was effected, the tubes were stripped from the mandrels and the ends thereof were buffed to a feather edge and then coated with a cement. The cement coated portions were next joined together and the splice so formed was cured in a special type of vulcanizer. Either of these methods were relatively slow and cumbersome because of the difficulty of joining the ends of the tubes in proper overlapping relation and also because of the excessive labor required to coat each individual tube with cement. Furthermore, the splice thus obtained in some cases was weak and under severe usage separation sometimes occurred. Also, the splice sometimes resulted in the formation of unsightly ridges about the tube.

This invention involves an apparatus for and method of splicing tubes, tread stock, or other rubber articles in which the portions to be joined are cut squarely or substantially squarely across by means of a suitable cutting device and the freshly severed ends are then brought together directly into abutting relation and are held in that position until adhesion takes place between the freshly severed ends. In splicing tubes the ends of the latter are flattened and united in a flattened condition.

For a better understanding of the invention, reference may now be had to the accompanying drawings, forming a part of the specification, in which:

Fig. 1 is a rear elevational view of a machine which may be employed in practicing the invention;

Fig. 2 is a front elevational view of the embodiment of the invention disclosed in Fig. 1;

Fig. 3 is a side elevational view of the device disclosed in Figs. 1 and 2;

Fig. 4 is an enlarged fragmentary cross-sectional view of the mechanism for severing the ends of tubes and forming the splice between the ends;

Fig. 5 is a cross-sectional view taken substantially upon the line V—V of Fig. 2;

Fig. 6 is a fragmentary view, disclosing the carriages for moving the ends of the tubes into abutting relation and the knife for severing the ends, in detail;

Fig. 7 is a view of the elements disclosed in Fig. 6, but disclosing them in a different phase with respect to each other in the cycle of operation;

Fig. 8 is a fragmentary view of a portion of an inner tube disclosing the splice which has been formed therein;

Fig. 9 is a conventional diagram of the pneumatic system employed for controlling the operation of the various elements of the splicing machine;

Fig. 10 is a cross-sectional view of a diaphragm valve employed for controlling the admission of fluid under compression to the actuating cylinders of the machine; and Fig. 11 is a diagrammatical view of a switch employed for controlling the operation of a cam actuating motor.

In practicing the invention, a base 20 is formed with an offset portion 22 having a vertical portion 24 upon which brackets 26 are secured. A cylinder 28, attached to these brackets, has a stuffing box or gland 30 which forms a fluid tight fit about the piston rod 32 that extends downwardly into the cylinder 28 and at its lower extremity is rigidly attached to a piston head 34 of conventional construction. Fluid under compression for actuating the piston is admitted to the upper and lower extremities of the cylinder by means of conduits 36 and 38 which lead to control devices, indicated generally at 39, in Fig. 9, which are to be described later.

The upper extremity of the piston rod 32 is rigidly attached to a rack 40 that engages gears 42 most clearly shown in Fig. 1. These gears are rigidly mounted upon horizontal shafts 44 that extend forwardly through and are journaled in the side of a housing 46 which is mounted upon the upper portion of the member 24 of the housing 20. The portions of the shaft 44 within the housing 46 have pinions 48 mounted thereon that engage and reciprocate a pair of horizontal racks 50 that are supported upon the lower faces of carriages or plates 52. The latter elements are formed with guides 54 that slide upon mating guides 56 upon the upper face of the housing 46.

As best shown in Figs. 4 and 5, the carriages 52 have upwardly extending brackets 58 secured to the rear edges thereof and provided at their upper ends with rearwardly projecting bifurcated portions 60 that constitute bearings for pins 62 upon which brackets 64 upon the upper ends of cylinders 66 are hingedly mounted. Pistons 68 within these cylinders are rigidly secured to downwardly projecting piston rods 70 which extend outwardly from the cylinder through stuffing boxes 72 of conventional design. The pistons 68 are actuated by means of fluid under compression admitted respectively to the upper and lower ends of the cylinders by means of flexible conduits 74 and 76 (see Figs. 1 and 9). The flow of fluid through the latter is controlled by means of the control system 39.

The lower extremities of piston rods 70 are hingedly attached to arms 78 which are hinged upon shafts 80 that extend inwardly from the lower portions of the brackets 58. Arms 78 have forwardly extending portions 82 that have clamping surfaces formed upon the lower faces thereof that engage rubber articles such as the ends of an inner tube 86 and clamp the latter in flattened condition upon the carriages 52. Sinuations 84 are formed on the sides of the clamp arms. A cross bar 88 interconnecting side plates 90 of the housing 20 has inwardly projecting brackets 92 secured thereto and an anvil actuating cylinder 94 is mounted upon these brackets. This cylinder receives a piston 96 which actuates a piston rod 98 having an anvil or platen 100 mounted upon the upper extremity thereof.

As shown in Fig. 5, the anvil 100 is formed with notched or serrulated edge portions 102 which mate with corresponding edges 104 upon the carriages 52. The anvil 100 is elevated to a position between the ends of the carriages 52 and afterward lowered, to permit the ends of the carriages to approach each other, by the admission of fluid under compression to the proper end of the cylinder 94 by means of upper and lower conduits 106 and 108 (see Figs. 2 and 9). These conduits lead to the control mechansm 39 previously referred to.

The housing 20 also has an upwardly extending portion 110, upon the forward face of which brackets 112 are secured, and these brackets support a vertical cylinder 114 which houses a piston shown in Fig. 4, connected to a downwardly extending piston rod 116. A guide 118, also mounted upon the forward face of the portion 110 of the housing, has a slide 120 mounted thereupon and this slide has a forwardly extending bracket 122 which, as shown in Figs. 3 and 4, is attached to the lower extremity of the piston rod 116. A pair of parallel knives 124 are secured to the sides of the bracket 122 in such position that the edges thereof contact with and sever projecting end portions of rubber articles which may be disposed upon the carriages 52 when the slide 120 is lowered. These knives have sinuations 126 formed therein which correspond to the notches serrulations 102 and 104 in the edges of the anvil 100 and the carriages 52. Fluid for actuating the piston rod 116 is admitted to the cylinder 114 by means of upper and lower conduits 128 and 130 (see Figs. 2 and 9) which, like the conduits previously described, are connected to the common valve control devices 39.

An electrical resistance 132, shown in Fig. 6, of conventional design, is mounted upon the bracket 122 and is attached to any convenient source of current (not shown). This element constitutes means for heating the knives 124 and thereby assists in the severing of the ends of the rubber articles by reducing the drag of the severed surface of the stock on the knife, which drag usually is substantial when a cold knife is used. Also, the heat renders the ends of the tubes soft and tacky and thus promotes the union when the ends are brought into contact. However, it is to be understood that it is not necessary to supply heat to the rubber articles, as the splice may be made cold, but it is preferred that heat be supplied. Brackets 134, secured to the rear face of the extension 110 upon the housing 20, support a vertical cylinder 136 which has a piston head 138 mounted therein. This head is attached to and actuates a vertically disposed piston rod 140 that extends downwardly and, at its lower end at a predetermined point in the cycle of operation of the machine, engages the upper end of the rack 40. The piston is actuated downwardly by means of fluid under compression which is admitted through upper conduit 142. Lower conduit 144 leads to the atmosphere and the operation of the piston 138 will be described later.

The piston head 138 and the piston head 34 are so controlled that during upward movement of the latter, the head 138 can be disposed in the lowermost position within the cylinder 136. In the latter position, the lower extremity of the rod 140 is disposed in the path of the rack 40 near the upper limit of travel of the latter. The cylinder 136 is of such size that the total pressure upon the piston 138 is greater than that upon the piston 34. Therefore, the rod 140 overcomes the upward urge exerted by the rack 40 and thus acts as a stop for the latter. If the rack should go completely up before pressure is supplied to piston 138 to limit this upward movement, the rack will be forced downwardly to its correct position as soon as such pressure is supplied. At the moment preceding or practically simultaneously with retraction of the knives 124 from the ends of the inner tube 86, the actuating pressure is released from the upper end of the cylinder 136, thereby permitting the rack bar to complete its upward movement and thus permitting a slight additional separation of the carriages 52. This additional separation tends to free the knives from the rubber compound constituting the ends of the tube and thus prevents adhesion between the latter and the knives.

The mechanism for controlling the operation of cylinders 28, 66, 94, 114 and 136 comprises diaphragm valves 150, 152, 154, 156, 158 and 160, best shown in Figs. 1 and 9. These valves are of conventional construction and a description of valve 150 is sufficient for all. The valve comprises a dome 162 that contains a conventional flexible diaphragm 164, shown in Fig. 10, which presses against rigid heads 166 upon the upper extremity of valve stem 168. Downwardly converging supports 170, attached to the dome 162, are secured to a tubular upper branch 172 of a three-way valve body 174. The latter also comprises tubular branches 176 and 178 which are disposed in coaxial alignment with respect to each other and at right angles with respect to the axis of the branch 172. The body further includes a downwardly extending tubular branch 180 which is disposed in coaxial alignment with the branch 172. A partition 182 extends diagonally across the intersection formed by the branches 176—178 and 172—180 in such manner as to separate the passage of the branch 176 from the branch 178 and correspondingly to separate the passages in the branch 172 from that within the branch 180. An opening 184 is formed in this partition and the lower extremity of the valve stem 168 projects therethrough and is provided with a head 186 which is adapted to seat against the lower face of the partition 182, thus to close the opening 184. The lower face of the head 186 also seats against the upper face of a transversely extending partition 188, which is disposed across the upper end of the opening within the branch 180, thus closing an opening 190 formed in the latter.

It is thus apparent that when the head 186 is depressed to close the opening 190 that a passage is formed through the branch 176, the opening 184 within the partition 182 and outwardly through the branch 178, thereby permitting a flow of fluid under compression therethrough. However, when the head 186 is elevated, the passage 184 is closed and fluid is permitted to circulate through the branch 180, the opening 190 and the branch 176. Fluid under compression for controlling the diaphragm 164 is admitted to the dome 162 by means of a conduit 194, indicated in Fig. 10.

As best shown in Fig. 9, the domes of valves 150 and 152 are interconnected by means of conduit 194, to which fluid under compression for actuating the diaphragms within the valves is supplied by means of a conduit 196. The lower branch 180 of valve 150 is connected by means of a conduit 198 to a conduit 200, which, as shown in Figs. 1 and 3, constitutes a manifold integrally cast with the base or housing 20 and which supplies fluid to the system under relatively high pressure. The corresponding branch of valve 152 is connected by means of conduits 202 and 208 to an exhaust muffler 212 which permits the escape of fluid under compression from the valves to the outer atmosphere. Similarly, branch 178 of valve 150 is connected to a conduit 214, which also discharges into the conduit 208 and from thence into the muffler 212. Branch 178 of valve 152 is connected to the fluid pressure main 200 by means of a conduit 216. The remaining branches 176 of valves 152 and 150 are respectively connected to the upper and lower ends of the rack and carriage operating cylinder 28 by means of conduits 220—36 and 222—38.

It is thus apparent that by admitting fluid under compression to the conduit 196, the diaphragms 164 of the valves 150 and 152 are simultaneously actuated downwardly to close the opening 190 to the branches 180 of the valves. This movement permits the escape of fluid through the conduits 222 and 214 from the lower end of the cylinder 28. Simultaneously, a passage is opened through the valve 152 and the conduits 216 and 220 to permit the flow of fluid to the upper end of the cylinder 28, thereby causing the piston 34 to travel downwardly to move the carriages 52 toward each other. Release of pressure within the conduit 196 permits the diaphragms within the valves 150 and 152 to rise, thus opening the passages 190 and closing the passages 184. This movement permits fluid from the main 200 to pass upwardly through conduit 198, valve 150 and conduit 222 to the lower end of cylinder 28, thus actuating the piston 34 upwardly. Simultaneously, the fluid within the cylinder 28 is permitted to exhaust through conduit 220, valve 152, conduit 202 and conduit 208 to the muffler 212.

This movement upwardly of the piston 34 operates rack 40 to move the carriages 52 apart. The diaphragms of valves 154 and 156 are simultaneously actuated by means of an interconnecting conduit 224 which is supplied with actuating fluid by means of a conduit 226. Branch 178 of valve 154 is connected to muffler 212 by means of conduits 228, 206 and 208 while the corresponding branch of valve 156 is connected to the fluid supply main 200 by means of a conduit 230. The lower branches 180 of valves 154 and 156 are respectively connected to the conduit 198 and to the muffler 212 by conduits 232 and conduits 234, 206 and 208. The remaining branches 176 of these valves are respectively connected to the lower and upper extremities of the knife operating cylinder 114 by means of conduits 130 and 128.

Downward actuation of the control rods 168 of valves 154 and 156 opens, by fluid through conduit 224, the exhaust passage from the lower end of knife operating cylinder 114 through conduits 130, 228, 206 and 208 to muffler 212 to permit downward movement of piston rod 116. Simultaneously, fluid flows through conduits 230 and 128 to actuate the piston rod 116 downwardly. Release of pressure within the conduit 224 causes rods 168 to rise, thus allowing the exhaust fluid to escape from the upper end of cylinder 114 to escape through conduit 128, valve 156, conduits 234, 206 and 208 to muffler 212. This operation is accompanied by flow of fluid under pressure through conduits 198, 232, valve 154 and conduit 130 to actuate piston rod 116 upwardly.

Fluid under compression for operating the piston 96 that controls the anvil 100 is supplied to the upper and lower ends of cylinder 94 by means of conduits 106 and 108. The latter conduit leads to a branch 237 which further leads to a small reservoir 240, which in turn is connected to the branch 176 of valve 160 by means of conduit 242. Fluid under compression is supplied to the valve 160 by means of a conduit 244, which is connected to the supply main 200 and to the branch 178 of the latter valve. Exhaust fluid from the valve escapes through a conduit 246, which is attached to the lower branch 180 of the valve and which extends upwardly into proximity to the rear edge of the anvil 100 where it is provided with an exhaust opening through which the fluid under compression is permitted to escape in such manner as to blow the severed portions of the tubes which are being spliced upon the anvil therefrom.

The strength and duration of the blast of air upon the anvil is greatly increased by reason of the reservoir 240 which constitutes a small storage chamber that increases the volume of air which is exhausted from the cylinder. The diaphragm 164 of valve 160 may conveniently be controlled by means of fluid admitted to the dome 162 by means of a conduit 248. A constant pressure of relatively low value is maintained upon the upper face of the piston 96 by means of conduit 106, which leads to the upper end of the cylinder 94 and to the supply line 238, that in turn leads to a tank 250, which is supplied with fluid under relatively low pressure by means of a reducing valve 251 and a conduit 251a leading to conduit 200. It will be observed that conduit 237 also communicates with conduit 142 leading to the upper end of cylinder 136. The purpose of this arrangement will be better understood later.

Valve 158 is supplied with fluid under compression by means of a conduit 252 which leads to a tank 254 containing fluid under materially higher pressure than that contained in the tank 250. The lower branch 180 of this valve is also connected to the exhaust muffler 212 by means of conduits 256, 228, 206 and 208. The remaining branch 176 of the valve supplies fluid under relatively high pressure to the clamp operating cylinders 66 through a conduit 258 which, in turn, is connected to flexible branches 76 that lead to the respective cylinders. Fluid for actuating the diaphragm within the valve is supplied through a conduit 262, which in turn is connected to a conduit 264 that leads to the conduit 238 and to points to be described later. It will be noted by reference to Fig. 9 that the low pressure supply line 238 also communicates with conduit 74 to constantly supply fluid under low pressure to cylinders 66 to urge pistons 68 downwardly whenever the pressure on the lower faces of these pistons is released.

The flow of fluid through the conduit 264 from low pressure line 238 is controlled by means of manually operated valves 266, which are so spaced as to require the operator to use both hands for the simultaneous operation thereof, thus insuring that the hands will be in such position as to render it impossible for them to be caught in the mechanism of the splicing machine at the time of operation of the latter. A suitable cam device for automatically and synchronously initiating the operation of the various valves 150, 152, 154, 156, 158 and 160 comprises a shaft 268, shown in Figs. 2, 3 and 9. This shaft is provided intermediate of its length with a gear 270, which intermeshes with a pinion 272 that is driven by means of a small motor 274. As shown in Fig. 2, the shaft may be journaled within suitable bearings 276 within a case 278, which is mounted upon the forward face of an upwardly extending bracket 280.

A series of cams 282, 284, 286 and 288, mounted upon the shaft 268, are of such configuration as to operate valve stems 290, which extend downwardly from valves 292, 294, 296 and 298 in the desired sequence. These valves are of conventional construction and are interconnected by means of a manifold 300, best shown in Figs. 2 and 9. Fluid under compression is supplied to the manifold for distribution to the valves by means of conduit 302, which leads to the low pressure line 238. The valves 292, 294, 296 and 298 are respectively connected to conduits 196, 248, 226 and 264 in such manner that at a predetermined point in the cycle of operation of the cams, the valves are operated to permit the flow of fluid through conduit 302, the manifold 300 and the previously mentioned conduits to operate valves 150, 152, 154, 156, 158 and 160. As will subsequently be made more clear, valve 294 is initially held open in the cycle of operation by cam 284, but valves 292, 296 and 298 are initially closed.

As best shown in Fig. 9, the motor 274 is supplied with actuating current through conductors 306 one of which leads to a switch 310. As shown in Fig. 11, this switch includes a pivoted arm 312 which, at its upper end, is attached to a cross arm 314 that engages the outer extremities of a pair of small piston rods 316 and 318. Rod 316 extends within a cylinder 320, the rear end of which communicates with a conduit 322 leading to the conduit 264. Upon operation of valves 266, fluid flows from the low pressure line 238 through the conduit 264 and the conduit 322 to actuate the piston in the cylinder 320, thus to swing the arm 312 outwardly to close the switch and start the motor. The flow of fluid from valves 266 through the conduit 322 is quickly shut off by closing these valves shortly after the motor has started. After the motor starts, valve 298 is opened by cam 288 and permits the flow of fluid from manifold 300 into conduits 322 and 264, thus supplanting the fluid from hand valves 266 and keeping the motor in operation. The motor is thus maintained in operation by fluid through valve 298 until cam 282 opens valve 292. As soon as the latter valve opens, fluid flows through manifold 300 into a conduit 326 leading to a cylinder 324, similar to cylinder 320 and in which piston rod 318 operates. The operation of rod 318 is similar to that of rod 316 and holds arm 312 in position to maintain the motor in operation until the cam shaft has made a complete revolution. In order that the operation of the motor will be continuous, the rod 318 is actuated prior to the closing of valve 298 and the consequent release of rod 316. After a complete revolution has been made by the cam shaft, both the valve 292 and the valve 298 are in such position that the flow of fluid through conduits 322 and 326 is cut off and it remains so until the manually controlled valves 266 are operated to initiate the next cycle.

In describing the operation of the machine, it will be assumed that all of the elements are in their initial positions with the motor 274 stopped. In such positions, it will be apparent that the piston 34 will be elevated and the carriages 52 separated, due to the flow of fluid from the manifold 200, through conduit 198, valve 150, conduit 222 and conduit 38 to the lower end of cylinder 28. However, piston 34 will not be completely elevated at this time because piston rod 140 is being urged downwardly to limit the upward movement of rack 40 and consequently of piston 34. In order to permit piston rod 140 to be urged downwardly at this time, cam 284 is arranged to hold open valve 294 to permit a flow of fluid from the low pressure supply line 238 through conduit 302, manifold 300, valve 294 and conduit 248 to the dome of valve 160. Valve stem 168 of the latter valve thus will be urged downwardly to allow fluid to pass from manifold 200 through conduit 244, valve 160, conduit 242, reservoir 240, conduit 237 and conduit 142 to the upper end of cylinder 136 in which piston 138 is located. In their initial positions, the carriages 52 are separated sufficiently to permit the anvil 100 to be arranged therebetween with the serrations 102 of the anvil interfitting with the serrations 104 on the carriages. In order that the anvil may be held between the carriages, conduit 108 leading to the lower end of the anvil cylinder 94 is connected to conduit 237 whereby when fluid is passed through the latter conduit into cylinder 136, it also will pass through conduit 108 to raise piston 96 and consequently maintain the anvil in elevated position as long as the flow of fluid continues in the manner stated. It will be noted that conduit 106, leading to the upper end of cylinder 94 is connected to the low pressure supply line 238, but the pressure entering the bottom of cylinder 94 is great enough to overcome the low pressure constantly maintained above piston 94. However, it will be obvious that as soon as the pressure on the bottom of piston 94 is released, the constant pressure on top thereof will force the piston and consequently the anvil downwardly out of the path of travel of the carriages 52.

Also, it will be observed that the initial position of the pistons 68 is downward, due to the flow of fluid from the low pressure supply line 238, through conduit 74 into the upper ends of cylinders 66. Therefore the clamp arms 82 will be out of clamping position initially The knives 124 will be elevated initially, due to the flow of fluid through manifold 200, conduits 198 and 232, valve 154, and conduit 130 into the lower end of the cylinder 114 associated with the knives.

At this time the ends of an inner tube to be spliced are disposed upon the carriages 52 in such manner that small portions thereof will project from beneath the clamp arms 82 when the latter are lowered, whereby these projecting portions may be cut off by the knives. Also, in order to prevent adhesion between the walls of the tube when clamped together, a material such as soapstone or the like is applied to the interior of the tube, as will be understood. Hand valves 266 now are operated and it will be apparent that the following events will occur. Fluid first will pass from the low pressure supply line 238 through valves 266 and conduits 264 and 262 into the dome of valve 158 to urge the stem 168 thereof downwardly. This will cause the passage of fluid from manifold 200, through high pressure tank 254, conduit 252, valve 158, conduits 258 and 76, into the lower ends of cylinders 66, thus to overcome the low pressure on the upper surfaces of pistons 68 and to lower the clamp arms 82 to properly secure the tube ends on the carriages in flattened condition. While fluid is passing to conduit 262 through conduit 264, it also will pass from the latter conduit into conduit 322 to operate switch 310 and start motor 274 to rotate cam shaft 268.

Upon rotation of cam shaft 268, cam 288 opens valve 298 and permits a flow of fluid from the low pressure supply line 238, through conduit 302, manifold 300, and valve 298, into conduit 264 to insure a flow of fluid from the latter conduit into conduit 262 to keep the clamp arms down and into conduit 322 to keep the motor in operation. Therefore, it will be apparent that as soon as valve 298 has been opened by cam 288, hand valves 266 can be closed, and the motor will continue to operate with the clamp arms remaining down. In operating the device, hand valves 266 therefor, are closed shortly after the motor begins to operate.

As cam shaft 268 continues to rotate, cam 286 will open valve 296 and permit a flow of fluid from supply line 238 through conduit 302, manifold 300, valve 296, conduits 226 and 224 into the domes of valves 156 and 154 respectively. This action will lower valve stems 168 in the latter valves and allow fluid to pass from manifold 200 through conduit 230, valve 156 and conduit 128 into the upper end of cylinder 114. At the same time fluid will exhaust from the lower end of cylinder 114 through conduit 130, valve 154, conduits 228, 206 and 208 into muffler 212. Thus the knives 124 will be lowered and will sever the ends of the tubes projecting from beneath the clamp arms. The sinuated portions on the knives interfit with the similar portions upon the clamp arms and as a consequence, after the knives sever the rubber, the freshly exposed surfaces of the latter will be serrated or notched similar to the notches of the carriages. By reason of the heat imparted to the rubber by the heat in the knives, the freshly exposed surfaces are relatively soft and tacky. However, as before stated, it is not essential that the knives be heated, as tacky surfaces on the ends of the tube can be obtained without the aid of heat and a very good cold splice can be made. After the knives have performed their function, valve 296 closes and it will be apparent that the knives then will return to elevated position.

Practically simultaneously with the closing of valve 296, valve 294 also is closed by the movement of cam 284 out of contact therewith. It will be remembered that valve 294 was open initially and it has remained open during the preceding steps of the cycle. The closing of valve 294 releases the pressure on the dome of valve 160 thereby permitting valve stem 168 thereof to rise to release the pressure through valve 160 from manifold 200. This release of pressure through the latter valve and in conduit 237 will result in the equalization of pressure on opposite sides of piston 138, as only atmospheric pressure is bearing on the lower face of this piston at all times. In this condition, piston 138 and its rod 140 can no longer oppose upward movement of the rack 46 and as pressure is still being exerted to raise the rack, the latter will rise to its highest position, thus affording a slight additional separation of carriages 52 for the purpose previously referred to. Also, with the release of pressure in conduit 237, it will be noted that no pressure will be exerted on the lower face of anvil piston 96 and that the pressure exerted on the upper face thereof from the low pressure supply line 238, will be sufficient to lower the anvil out of the path of movement of the carriages. Downward movement of piston 96 will exhaust fluid through the various passages leading to conduit 246 and will cause a blast to be directed from the latter conduit for the purpose previously explained.

As soon as the foregoing steps have been completed, the cam shaft will have reached a position whereby cam 282 will open valve 292. Opening of the latter valve will cause the passage of fluid from supply line 238 through conduit 302, manifold 300, valve 292, and conduit 326, into cylinder 324 to move rod 318 into a position assisting rod 316 in holding closed switch 310. For a short period of time both rods 316 and 318 serve the same function. Also, as valve 292 opens, fluid passes from supply line 238 through this valve into conduits 196 and 194 to enter the domes of valves 152 and 150 respectively. The stems in the latter valves thereby will be urged downwardly and fluid will pass from manifold 200 through conduit 210, valve 152, conduits 220 and 36 into the upper end of the rack cylinder 28 to urge the rack downwardly to move carriages 52 toward each other. Fluid will exhaust from the lower end of cylinder 28 through the various passages provided therefor into muffler 212. As the carriages move toward each other, the ends of the tube are brought into contact and the serrated surfaces on the ends interfit with each other to form an excellent splice. Preferably, these tube ends are held in contact with each other for a few seconds in order to insure complete adhesion.

After the splice is complete, cam 288 will have reached a position closing valve 296 and releasing the pressure in conduit 322 leading to cylinder 320, thereby releasing the pressure on rod 316 whereby the latter rod will not satisfactorily hold the switch closed. From this point in the cycle of operation until the latter is complete, rod 316 functions to keep the switch closed and the motor in operation. With the closing of valve 296, it will be apparent that the pressure in conduits 264 and 262 will be released, thus allowing the valve stem in valve 158 to rise whereby the flow of fluid through this valve from the manifold will be stopped. This will result in a release of pressure on the lower faces of pistons 68 and the low pressure constantly acting on the upper faces of these pistons will move the latter downwardly, thereby raising the clamp arms 82.

When the clamp arms have been raised, cam 282 operates to close valve 292 to effect a return of the carriages to their separated starting position and the spliced tube then is removed from the machine. As valve 292 closes, the motor obviously must cease to operate and after it stops, cam 284 will be in a position holding open valve 294 to insure the return to initial positions of the anvil 100 and the piston rod 140 limiting upward movement of rack 40. In operation, the rack may have reached its upper limit of movement after valve 292 closes, but the rod 140 has sufficient pressure acting thereon to push the rack downwardly to insure the latter being in proper starting position. The cycle may be repeated by again opening hand valves 266, as will be understood.

The freshly spliced tube may be placed in a suitable mold (not shown) and vulcanized. The union produced is most clearly shown in Fig. 8, in which the serrated ends of the tube are shown joined together along the line 400.

The machine may be used to splice together the ends of single units of rubber, such as inner tubes for tires or flat strips such as are employed as tread units for tires, or it may be employed for splicing a plurality of units to form single units. The use of the machine results in the formation of a splice which is substantially uniform in thickness, thereby obviating any unsightly ridges about the articles at the point of the splice. Also, the splice is effected mechanically in a minimum period of time. A further advantage of the use of the invention consists in the fact that by reason of the automatic nature of the operation of the machine, skilled labor for the operation thereof is unnecessary. Therefore, laborers who may be obtained at a small expense may be employed in the operation thereof.

Although I have illustrated and described but the preferred embodiment of the invention, it will be apparent to those skilled in the art that the invention is not so limited but that various modifications may be made therein without departing from the spirit of the invention or from the scope of the appended claims.

What I claim is:

1. A machine for splicing two portions of rubber comprising longitudinally movable carriages, means for clamping the portions upon the carriages, means for heating the surfaces which are to be joined, and means to move the carriages toward each other to bring the surfaces into contact with each other.

2. A machine for splicing two portions of unvulcanized rubber comprising a pair of coaxially reciprocating carriages, means for clamping the portions to be spliced upon the carriages, and means to sever small portions from the ends of the portions to be spliced, and means to reciprocate the carriages to bring the freshly exposed surfaces into contact with each other.

3. A machine for splicing a plurality of portions of unvulcanized rubber which comprises a pair of coaxially reciprocating carriages, means for clamping the portions to be spliced upon the carriages, means for severing small portions from the ends of the members to be spliced, means for heating the freshly exposed surfaces, and means to reciprocate the carriages to bring the exposed surfaces into contact with each other.

4. A machine for splicing a plurality of bodies of unvulcanized rubber comprising a pair of coaxially reciprocating carriages, means to clamp the bodies upon the carriages, means to sever portions from the bodies upon the carriages thereby to expose fresh surfaces of rubber, means to bring the surfaces into contact, and means for successively initiating the operation of the previously described means.

5. A machine for splicing two portions of rubber comprising a pair of coaxially reciprocating carriages, an anvil disposed between the carriages for supporting the portions, a reciprocating knife for cutting portions of rubber from the portions, means to reciprocate the carriages, means for successively causing the actuation of the knife to sever portions from the bodies, means to move the anvil out of the path of the carriages, and means to cause the actuation of the carriages toward each other to bring the freshly exposed surfaces of the portions into contact with each other.

6. In a machine for splicing an inner tube, in combination clamping arms operable to flatten and hold flat the ends of the tube, means for heating the ends of the tube to produce tacky surfaces thereon, and means operable after operation of said arms for uniting the tacky surfaces in abutting relation while the tube ends are held flat.

7. In a machine for splicing an inner tube, in combination arms operable to flatten the ends of the tube, cutters for severing a portion from the ends of the tube while said ends are held flat to provide freshly exposed surfaces thereon, and means operable after operation of said arms for uniting said surfaces in abutting relation while the tube ends are held flat.

8. In a machine for splicing an inner tube, in combination arms operable to flatten the ends of the tube, cutters for severing a portion from the ends of the tube while said ends are held fast to provide freshly exposed surfaces thereon, means to produce a tacky condition of the freshly exposed surfaces, and means operable after operation of said arms for uniting said surfaces in abutting relation while the tube ends are held flat.

9. In a machine for splicing rubber, in combination, a pair of reciprocating carriages, a member adapted to be arranged between the carriages and movable out of the path of travel of the latter, means for securing rubber on each of said carriages with portions of the rubber projecting therefrom, means for cutting off said projecting portions, means for moving said member out of the path of travel of the carriages, and means for moving the carriages toward each other to bring the pieces of rubber together.

10. A combination as recited in claim 9 in which each carriage is provided with serrated or notched edges, said member being provided with similar edges adapted to interfit with the carriage edges.

11. A combination as recited in claim 9 in which each securing means for the rubber is provided with sinuated sides, said cutting means being provided with sinuations adapted to interfit with said sides and to provide serrated surfaces on the portions of rubber to be spliced.

12. In a machine for splicing rubber, in combination, means for supporting at least two pieces of rubber with their adjacent ends in completely flat spaced relation, means for simultaneously heating and severing portions of the rubber to provide freshly exposed tacky surfaces, said severing means being provided with sinuations adapted to form serrations on the freshly exposed surfaces, and means for moving the pieces of rubber together to unite the freshly exposed surfaces with the respective serrations interfitting.

13. In a machine for splicing rubber, in combination, means for supporting at least two pieces of rubber with their adjacent ends in completely flat spaced relation, means for simultaneously heating and forming serrated edges on the surfaces of the rubber to be spliced, and means for moving the edges of the rubber into contact with the respective serrations interfitting.

14. A machine for splicing an inner tube comprising spaced movable supports each receiving an end of the tube, a clamping arm operable to completely flatten and hold completely flat each end of the tube on its respective support, and means operable after operation of said arms for moving said supports toward each other and thereby moving said tube ends into abutting engagement with each other to be united while held completely flat.

15. A machine for splicing an inner tube comprising spaced movable supports each receiving an end of the tube, a clamping arm operable to completely flatten and hold completely flat each end of the tube on its respective support, means for simultaneously heating and removing portions from each end of the tube to produce tacky surfaces at the ends of the tube, and means operable after operation of said heating and removing means for moving said supports toward each other and thereby moving said tacky tube ends into abutting engagement with each other to be united while completely held flat.

16. A machine of the character described in claim 15 in which the clamping arms, the means to produce tacky surfaces and the means for moving the tube ends together are operated automatically in succession.

17. A machine for splicing an inner tube comprising spaced movable supports each receiving an end of the tube, a clamping arm operable to flatten and hold flat each end of the tube on its respective support, cutters for severing a portion from the ends of the tube while said ends are held flat to provide freshly exposed surfaces thereon, and means operable after the operation of said arms for moving said supports toward each other thereby moving said freshly exposed tube ends into abutting engagement with each other to be united while held flat.

18. A machine of the character described in claim 17 in which the clamping arms, the cutters and the means for moving the tube ends together are operated automatically in succession.

19. A machine for splicing an inner tube comprising spaced movable supports each receiving an end of the tube, a clamping arm operable to flatten and hold flat each end of the tube on its respective support, means for heating the ends of the tube to produce tacky surfaces thereon, and means operable after the operation of said arms for moving said supports toward each other and thereby moving said tacky tube ends into abutting engagement with each other to be united while held flat.

20. A machine of the character described in claim 19 in which the clamping arms, the heating means and means for moving the tube ends together are operated automatically in succession.

21. A machine for splicing an inner tube comprising spaced movable supports each receiving an end of the tube, a clamping arm operable to flatten and hold flat each end of the tube on its respective support, heated cutters for severing a portion from the ends of the tube to provide freshly exposed heated surfaces thereon, and means operable after the operation of said arms for moving said supports toward each other and thereby moving said freshly exposed heated tube ends into abutting engagement with each other to be united while held flat.

22. A machine of the character described in claim 21 in which the clamping arms, the heated cutters and the means for moving the tube ends together are operated automatically in succession.

23. Tube splicing apparatus comprising means for supporting the end portions of a length of tubing in determinate positions, means for severing material from the respective ends of the tubing while they are so supported, and means for subsequently effecting such relative movement of the tube supports as to bring the tube ends forcibly into end-to-end engagement.

24. Tube splicing apparatus comprising means for supporting the end portions of a length of tubing in determinate positions, means for severing material from the respective ends of the tubing while they are so supported, and means for effecting such relative movement of the tube supports as to bring the tube ends forcibly into end-to-end engagement, said severing means being so constructed and arranged as concurrently to sever both tube ends.

25. In tube splicing apparatus the combination of a pair of clamps adapted to flatten the respective end portions of a tube and to support them in determinate positions, means for concurrently severing material from the respective end portions of the tube, and means for moving the clamps together to bring the tube ends forcibly into end-to-end engagement.

26. A machine for splicing an inner tube comprising means for completely flattening and holding completely flat the ends of the tube, and means for moving the flattened ends into engagement with each other whereby the ends may be joined while completely flat.

27. A machine for splicing an inner tube comprising means for completely flattening the ends of the tube, means to produce a tacky condition at the ends of the tube, and means to subsequently move the tacky surfaces into engagement while the ends of the tube are completely flat.

28. A machine for splicing an inner tube comprising means for completely flattening the ends of the tube, means for severing a portion from the ends of the tube to provide freshly exposed tacky surfaces thereon, and means for subsequently uniting said tacky surfaces while the tube ends are completely flat.

29. A machine for splicing an inner tube comprising means for flattening the ends of the tube, means for serving a portion from the ends of the tube to provide freshly exposed surfaces thereon, means to produce a tacky condition of the freshly exposed surfaces, and means for uniting said surfaces while the tube ends are flat.

30. A machine for splicing rubber comprising spaced movable means each receiving a portion of the rubber, mechanism for holding the rubber portions upon said means with their ends in completely flattened positions, means for severing a part from the ends of each of the rubber portions to provide freshly exposed tacky surfaces thereon, and means operable after operation of said severing means for moving the portions into contact with each other.

31. A machine for splicing an inner tube comprising means for flattening the ends of the tube, means for severing a portion from the ends of the tube to provide end surfaces at right angles to the surface of the tube, and means for uniting said end surfaces to form a butt splice.

32. A machine for splicing an inner tube comprising means for flattening the ends of the tube, means for severing a portion from the ends of the tube to provide end surfaces at right angles to the surface of the tube, means to produce a tacky condition at the ends of the tube, and means for uniting said end surfaces to form a butt splice.

33. In a machine for splicing an inner tube, in combination, clamping arms operable to flatten and hold completely flat the ends of the tube, and means operable after operation of said arms for uniting the ends in straight abutting relation while the tube ends are completely flat.

34. In a machine for splicing an inner tube, in combination, arms operable to completely flatten the ends of the tube, means to produce a tacky condition at the ends of the tube, and means operable after operation of said arms and subsequent to the operation of said first-named means to move the tacky surfaces into straight abutting engagement while the ends of the tube are held completely flat.

35. In a machine for splicing an inner tube, in combination, arms operable to completely flatten the ends of the tube, cutters for providing freshly exposed serrated surfaces on the ends of the tube while said ends are held completely flat, and means operable after operation of said arms and subsequent to the operation of said cutters for uniting said surfaces with the serrations in interfitting relation while the tube ends are held completely flat.

36. A machine for splicing two pieces of rubber comprising spaced movable supports each receiving a portion of the rubber, arms operable to completely flatten the ends of the rubber portions upon said supports, means operable while said ends are held completely flat to produce a tacky condition at said ends, and means operable after operation of said arms and subsequent to the operation of said first-named means for moving said ends into straight abutting contact while said ends are held completely flat.

37. A machine for splicing an inner tube comprising spaced movable supports each receiving an end of the tube, clamping arms operable to flatten and hold flat each end of the tube on its respective support, means to produce tacky surfaces at the ends of the tube, and means operable after operation of said arms for moving said supports toward each other and thereby moving said tacky tube ends into abutting engagement with each other to be united while held completely flat, said clamping arms, said means to produce tacky surfaces and said means for moving the tube ends together being operated automatically in succession.

JORGEN I. HAASE.